United States Patent
Yang

(10) Patent No.: US 7,458,333 B2
(45) Date of Patent: Dec. 2, 2008

(54) COVERING AND SECURING STRUCTURE FOR A COVERING BODY

(75) Inventor: Ming-Shun Yang, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 11/492,952

(22) Filed: Jul. 26, 2006

(65) Prior Publication Data

US 2007/0295262 A1  Dec. 27, 2007

(30) Foreign Application Priority Data

Jun. 23, 2006  (TW)  .............................. 95122624 A

(51) Int. Cl.
*B63B 17/02* (2006.01)
*B65D 65/02* (2006.01)
*B60P 7/02* (2006.01)

(52) U.S. Cl. ................... 114/361; 150/166; 296/100.18
(58) Field of Classification Search ................... 114/361
See application file for complete search history.

(56) References Cited

U.S. PATENT DOCUMENTS

| 2,493,833 | A | * | 1/1950 | Reynolds | ..................... 114/361 |
| 3,354,892 | A | * | 11/1967 | Frieder | ........................ 114/361 |
| 5,355,829 | A | * | 10/1994 | Waddell et al. | ............. 114/361 |
| 5,368,281 | A | * | 11/1994 | Skyba | ......................... 254/391 |
| 7,111,572 | B1 | * | 9/2006 | Yang | ........................... 114/199 |

* cited by examiner

*Primary Examiner*—Jesús D Sotelo
(74) *Attorney, Agent, or Firm*—Troxell Law Office, PLLC

(57) ABSTRACT

A covering and securing structure for a covering body, which includes a covering that can be laid over an object, and a hem located on a circumferential edge of the covering enables a tether to be threaded therethrough. A plurality of recesses are defined in the hem, and each of the recesses enables the tether to be joined to externally located ropes. When the covering body is laid over the external portion of an object to be covered and bound tight, then the plurality of ropes on the circumferential edge of the covering body are joined to the tether and a tugging action is collectively applied to the ropes, thereby achieving covering and securing protective effectiveness.

5 Claims, 11 Drawing Sheets

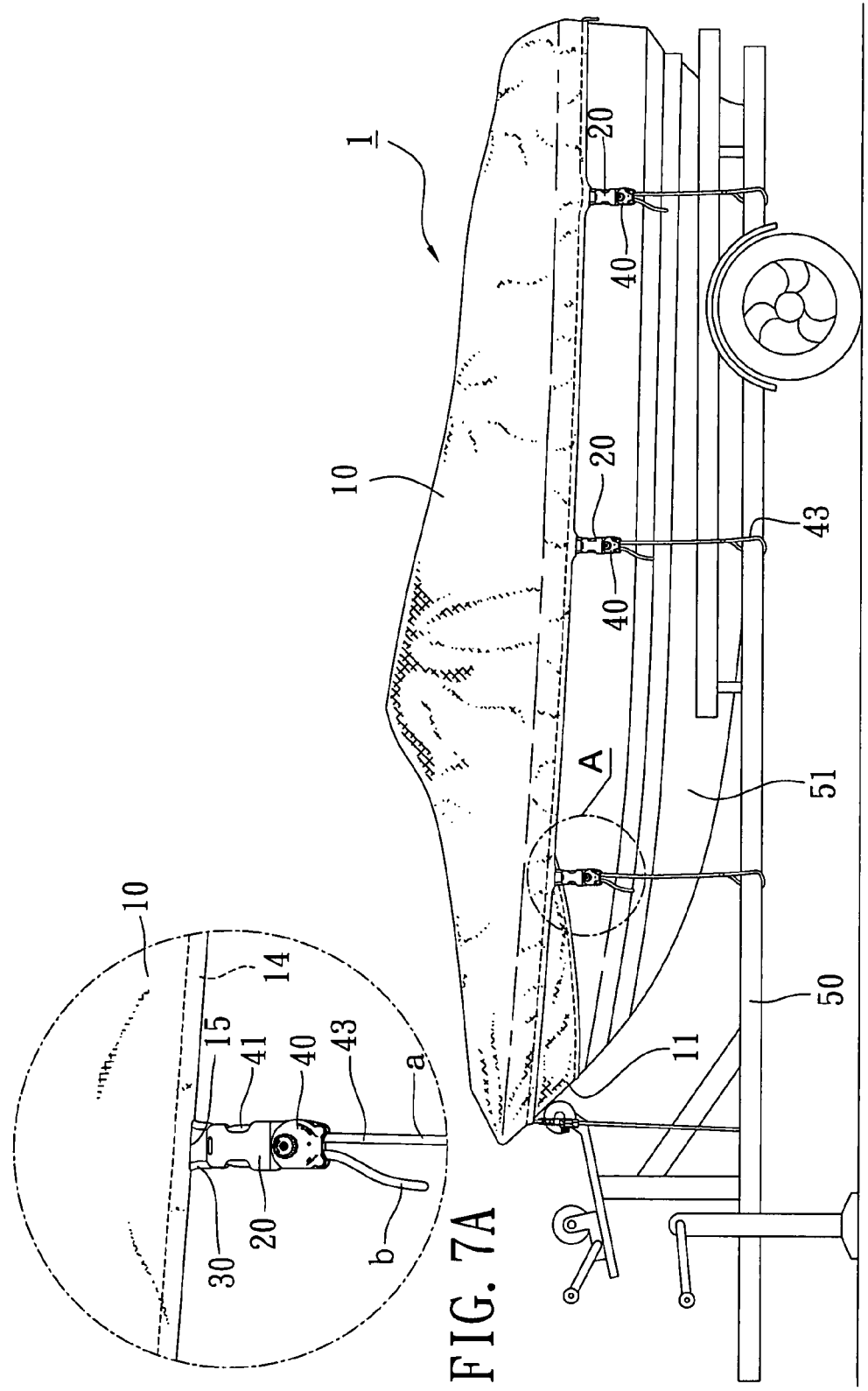

COVERING AND SECURING STRUCTURE FOR A COVERING BODY

BACKGROUND OF THE INVENTION (a) Field of the Invention

The present invention is related to a covering and securing structure for a covering body, and more particularly to a covering body applicable for use in covering a yacht, car and freight, which renders a simpler and more convenient handling of the covering body, operation, and better enables achieving covering and securing protective effectiveness.

(b) Description of the Prior Art

A covering body provides protective effectiveness to prevent dust and rain from falling onto articles covered thereby, and can further prevent exposure to sunlight outdoors, which would otherwise result in cracking and damage to the articles. Taking a yacht as an example, when the yacht is berthed and not being used, then a user loads the yacht onto a trailer for transporting, and covers the yacht with the covering body to protect the yacht hull and prevent scratching. There are numerous forms of covering bodies sold in the current market, however they are primarily designed with a covering to correspond to the hull, and an elastic tape is located on a circumferential edge of the covering. Such a design enables the covering to be laid over the hull, whereafter the elastic tape is used to tighten and bind the covering round the hull.

However, because of the immense bulk of the hull, thus, when a user covers the hull with the covering body, the hull must be covered successively from the bow of the yacht to the stern by using the Covering body in order to complete securing and tightening of the periphery of the covering body. Hence, handling of prior art is extremely inconvenient. If the covering body is not adequately tied down, then when outdoors, or during the course of transporting, it is extremely easy for the covering body to be swept up unexpectedly by a strong wind and blown out of position. Hence, there is a need to provide a covering body which is convenient to use and enables secure covering.

Referring to FIG. 11, which shows a covering body structure of prior art, wherein an elastic tape 47 is located on a circumferential edge. Furthermore, flat woven tapes 31 are stitched to an edge of the covering body and joined to fastening members 20 or retaining rings. However, in order to securely join the woven tapes 31 to the covering body, usually tens of stitches 32 are stitched between the covering body and the tapes 31. Hence, in such a configuration, because of the excessive stitching of the stitches 32, the needle of the stitching machine pierces the material of the covering body multiple times, and forcibly pulling down on the woven tape 31 easily results in the covering body being torn open and damaged. Moreover, because the aforementioned woven tapes 31 are directly joined to the edge of the covering body, force subjected thereto will be excessively concentrated at a point, thereby excluding closefitting covering effectiveness of the covering body.

SUMMARY OF THE INVENTION

A primary objective of the present invention is to provide a covering and securing structure for a covering body that realizes effectiveness of convenient and quick handling, which enables the covering body to securely cover a hull, thus preventing the occurrence of blowing-off of the covering body by a strong wind.

Another objective of the present invention is to provide the covering and securing structure for a covering body that enables secure covering of a hull by the covering body when force is exerted thereon by pulling down on ropes located at several positions on a circumferential edge thereof, while simultaneously preventing the ropes from damaging the covering body material, thereby achieving effectiveness of maintaining and extending operational life of the covering body. Moreover, the covering and securing structure for a covering body is able to improve regional distribution of strained surface exerted by the ropes, thereby better averaging out the force exerted on the covering body.

In order to achieve the aforementioned objectives, the covering and securing structure for a covering body of the present invention is structured to comprise a covering, a tether and a plurality of ropes. A circumferential edge of the covering is provided with a hem that enables the tether to be threaded therethrough, and the hem is cut so as to form a plurality of recesses therein. The plurality of ropes are respectively mutually joined to the exposed tether sections at the recess areas of the covering. To complete structural configuration of the covering body, a strengthening piece is stitched to the hem at the rear end of the covering, and a set of two retaining ring fastening members is located on two sides of the strengthening piece, and two adjacent sides of the strengthening piece enable the tether to pass through the hem. Accordingly, the covering body is able to cover articles desired to be covered, and the tether threaded through the hem is able to clasp round the retaining ring fastening members located at the two sides of the strengthening piece. Whereupon, force is applied to pull on the plurality of ropes of the circumferential edge after binding thereof to achieve convenient and quick handling of the covering body and covering and securing effectiveness.

For a complete understanding of said objectives and embodiments of the invention, the following detailed description of the invention and the claims should be read in conjunction with the accompanying drawings.

BRIEF DESCRIPTION OF THE DRAWINGS

FIG. 7 shows a side view of the first embodiment of the present invention in use.

FIG. 7A shows a partially enlarged schematic view of the first embodiment of the present invention.

FIG. 9A shows a partial enlarged schematic view of the second embodiment of the present invention.

DETAILED DESCRIPTION OF THE PREFERRED EMBODIMENTS

Figure 1:
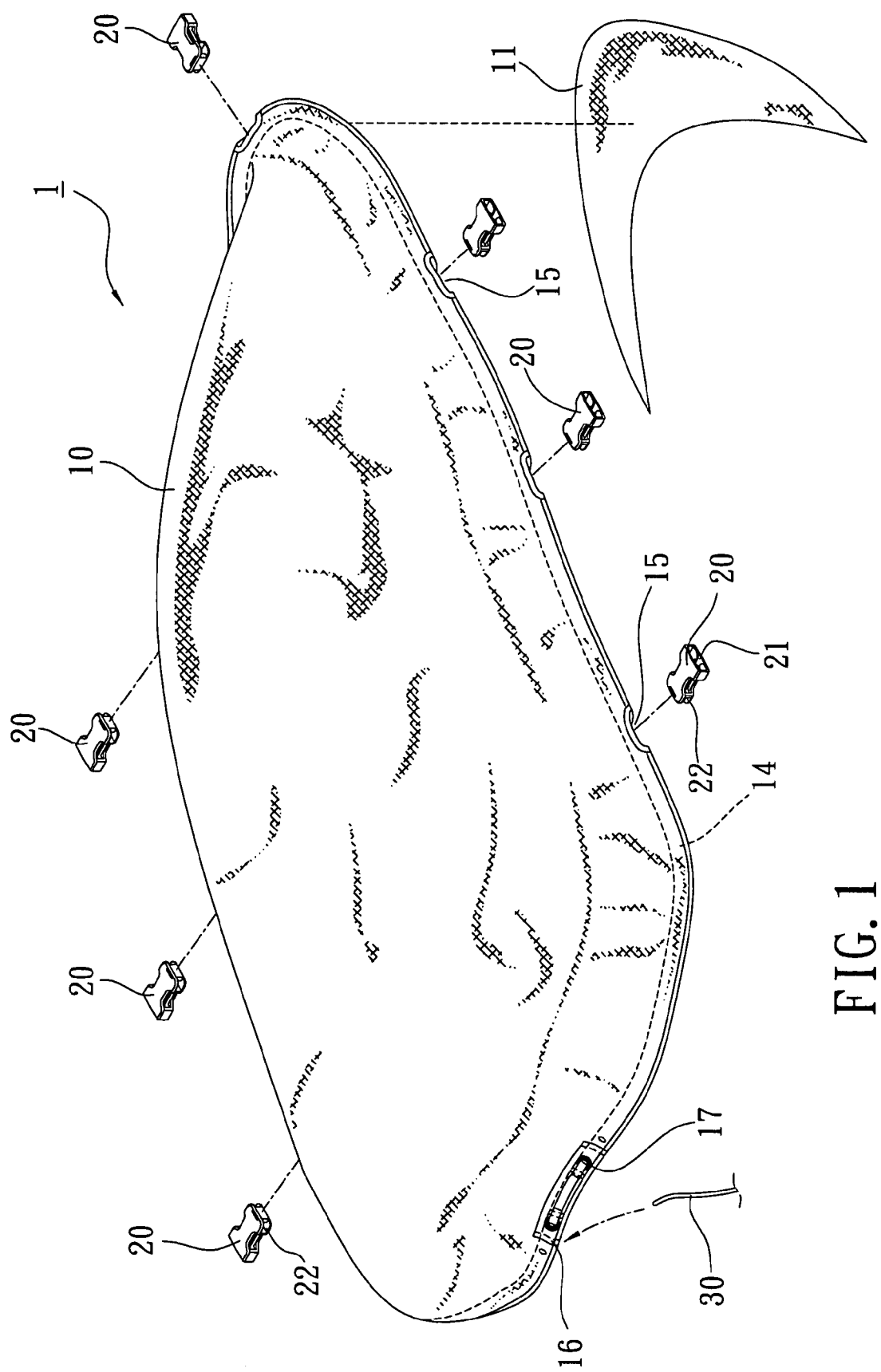
FIG. 1 shows an exploded view of a first embodiment according to the present invention.
Figure 2:
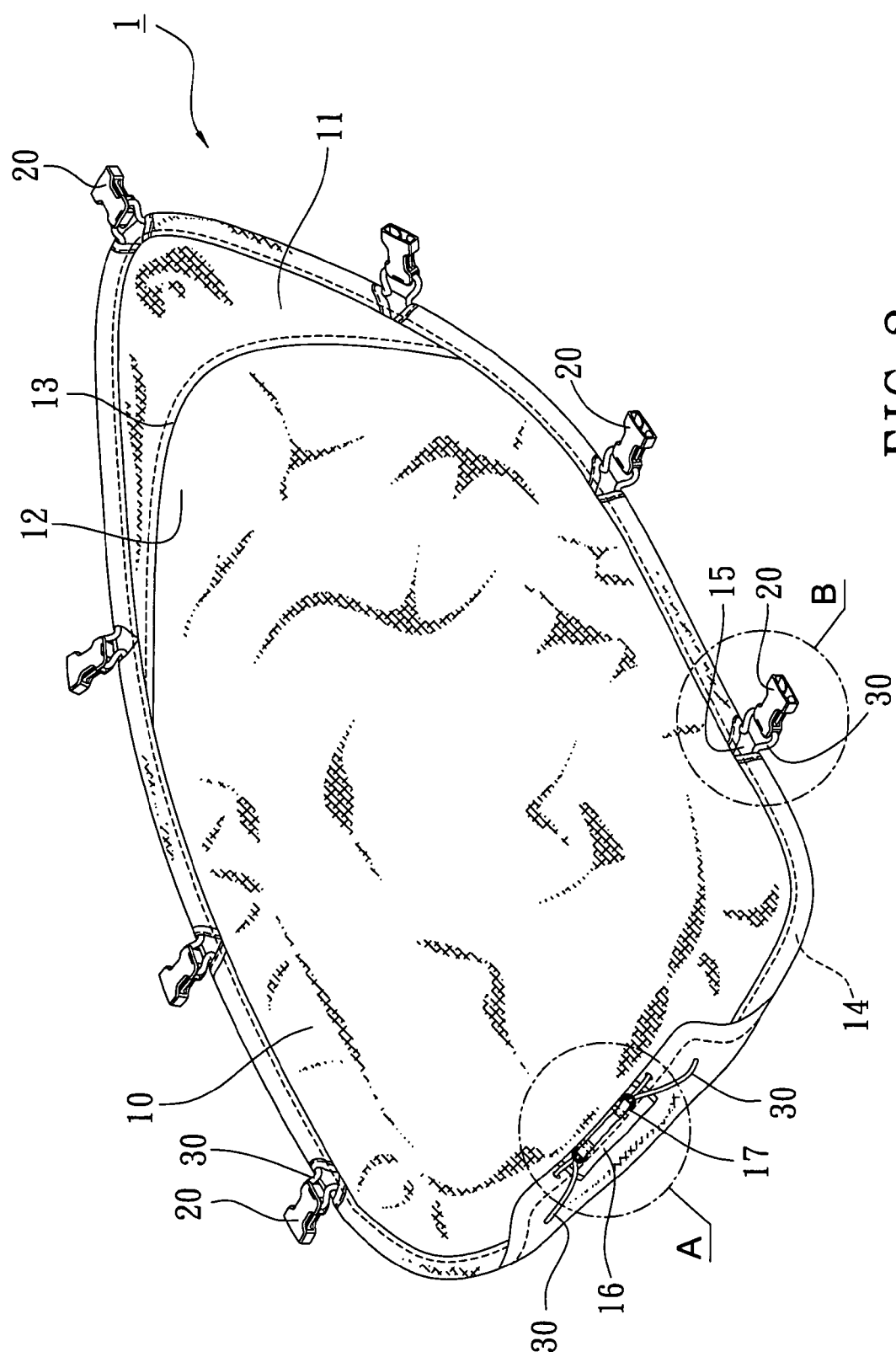
FIG. 2 shows a rear view of the assembled first embodiment according to the present invention.

Referring to FIGS. 1 and 2, which show a covering body 1 of the present invention structured to comprise a covering 10, a plurality of female fastening members 20 and a tether 30.

The covering 10 can be a flat piece of fabric, and can also be cut and fabricated to be a three-dimensional form to conform to the object to be covered. The embodiment depicted in FIGS. 1 and 2 depicts a design of the covering 10 cut and fabricated to fit the exterior form of a hull. A bottom side edge of a front end of the covering body 1 corresponding to a bow area and an outer edge of a fabric piece 11 are mutually stitched together, thereby enabling a front end of the covering 10 and the fabric piece 11 stitched to the covering body 1 to form an open pocket 12, and an elastic 13 is located in a side edge of an opening of the pocket 12 of the fabric piece 11. A circumferential edge of the covering 10 fabric is folded back and stitched to form a hem 14 that enables the tether 30 to be threaded therethrough (see FIG. 2B), and the hem 14 is cut so as to form a plurality of recesses 15 therein. A strengthening piece 16 is stitched to the hem 14 at a rear end of the covering 10, and a set of two retaining ring fastening members 17 (see FIG. 2A) is located on two sides of the strengthening piece 16.

The plurality of female fastening members 20 are respectively disposed within the recesses 15 of the covering 10. An insertion slot 21 is defined at a front end of each of the female fastening member 20, and a through hole 22 is defined in a rear end (see FIG. 2B).

Figure 2B:
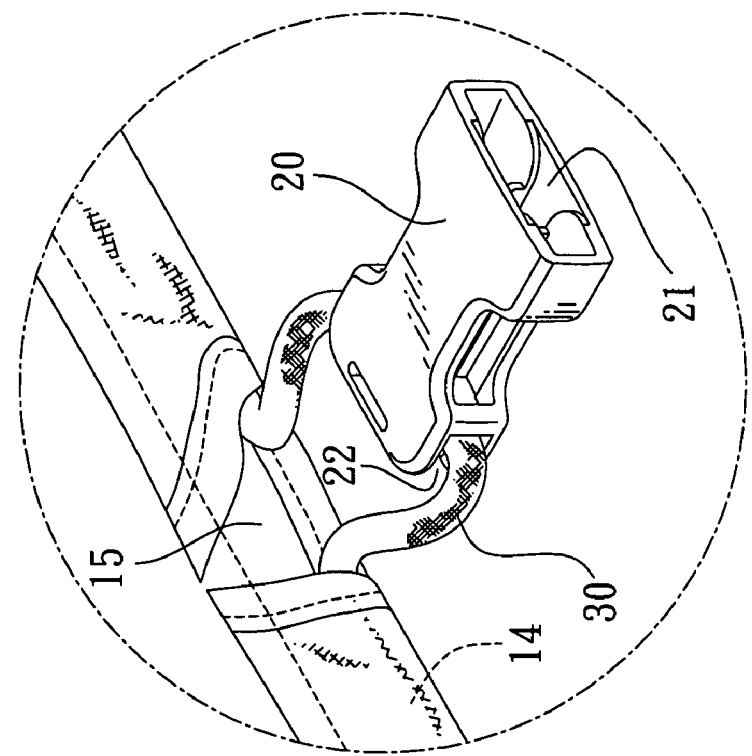
FIG. 2B shows an enlarged structural schematic view of a female fastening member located on a circumferential edge of the first embodiment according to the present invention.
Figure 2A:
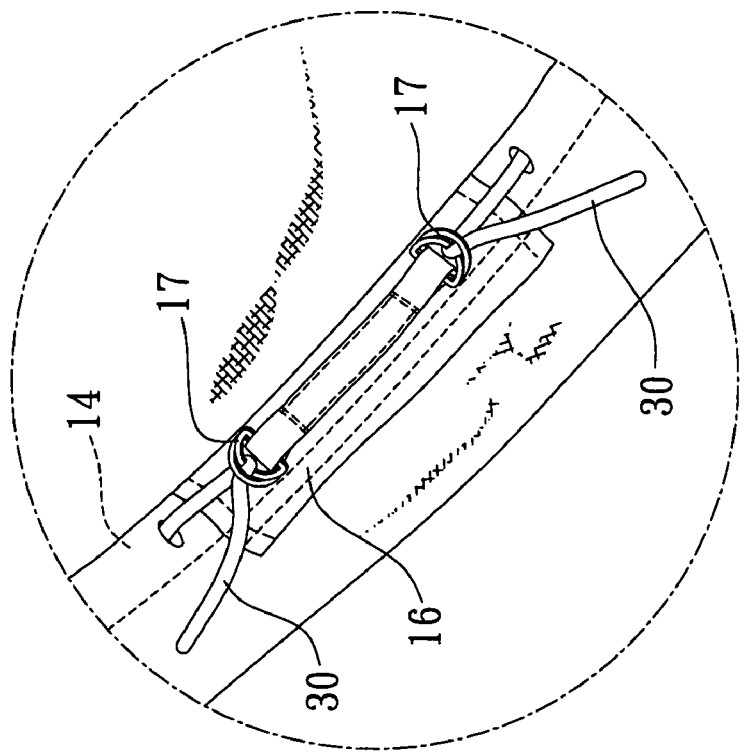
FIG. 2A shows an enlarged structural schematic view of retaining rings at a rear end of the first embodiment according to the present invention.

Referring to FIGS. 2A and 2B, the tether 30 is threaded through the hem 14 of the circumferential edge of the covering 10, and is simultaneously threaded through and disposed within the through hole 22 at the rear end of each of the female fastening members 20 within the recesses 15. Moreover, two ends of the tether 30 respectively pass through and are wound round the retaining ring fastening members 17 at the rear end of the covering 10, thereby completing structural configuration of the novel covering body 1.

Figure 4:
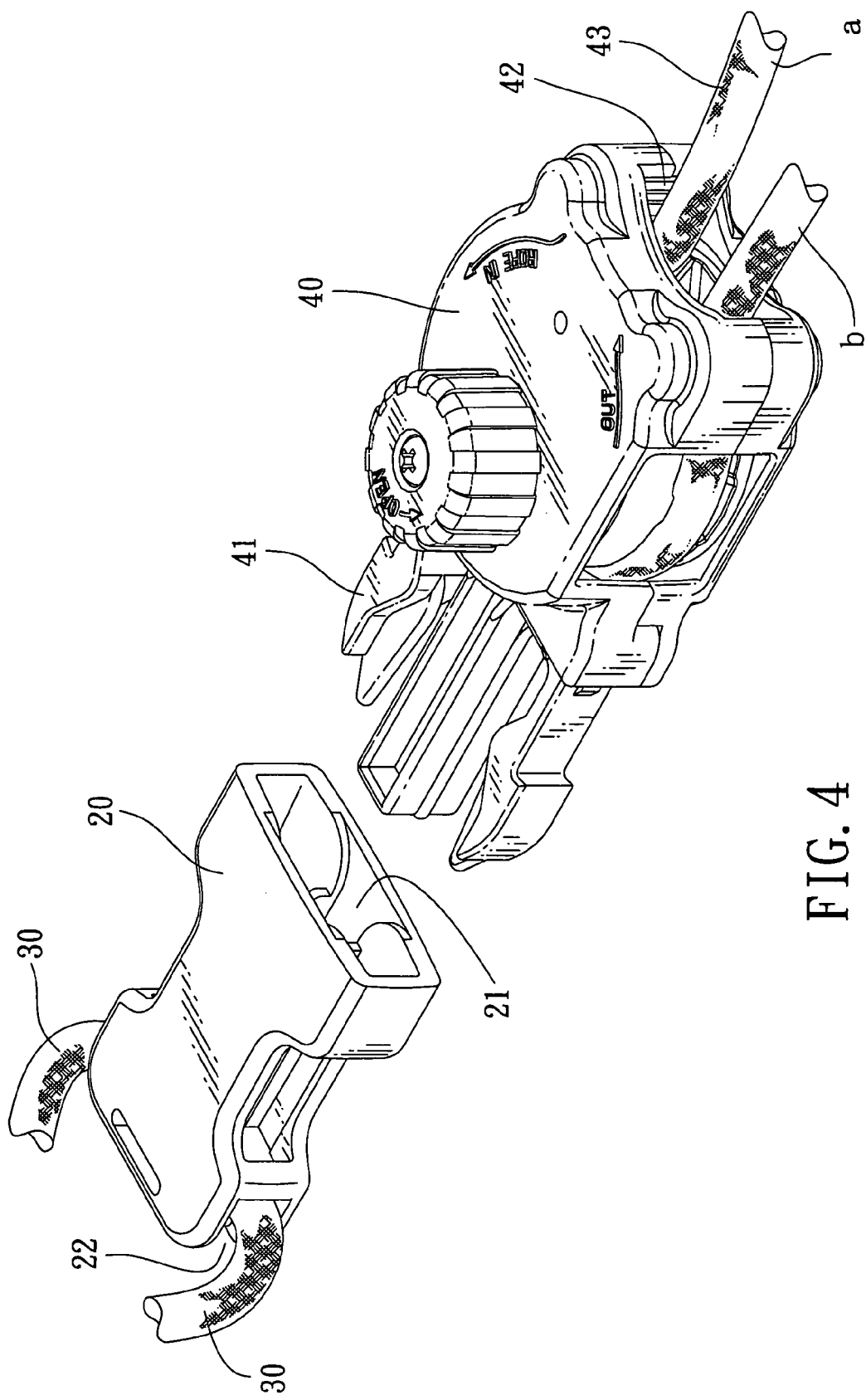
FIG. 4 shows a perspective view depicting an antislip fastening member functioning in coordination with the female fastening member according to the present invention.

Referring to FIG. 4 which shows another configuration of the female fastening member 20 designed to be located on the covering body 1 of the present invention, and each of the female fastening members 20 functions in coordination with a joining member to effect mutual fastening thereof. The joining member is an antislip fastening member 40 provided with a unidirectional binding rope antislip fastening member 40, and is used to be fixedly inserted into the insertion slot 21 at the front end of the female fastening member 20. A rope 43 is located at a rear portion of the antislip fastening member 40, and a securing end of the rope 43 is secured to a load carrier (trailer) 50 (see FIG. 7). The rope 43 passes through an entrance-exit 42 at a bottom portion of the body of the antislip fastening member 40 and winds round an unidirectional antislip mechanism located within the antislip fastening member 40 (not shown in the drawings), whereafter a pulling end b of the rope 43 extends out one side Accordingly, pulling the pulling end b of the rope 43 enables the rope 43 to achieve an antislip binding effect. The insertion slot 21 of the aforementioned female fastening member 20 and the flexible insertion member 41 of the antislip fastening member 40 can be mutually swapped.

Figure 10:
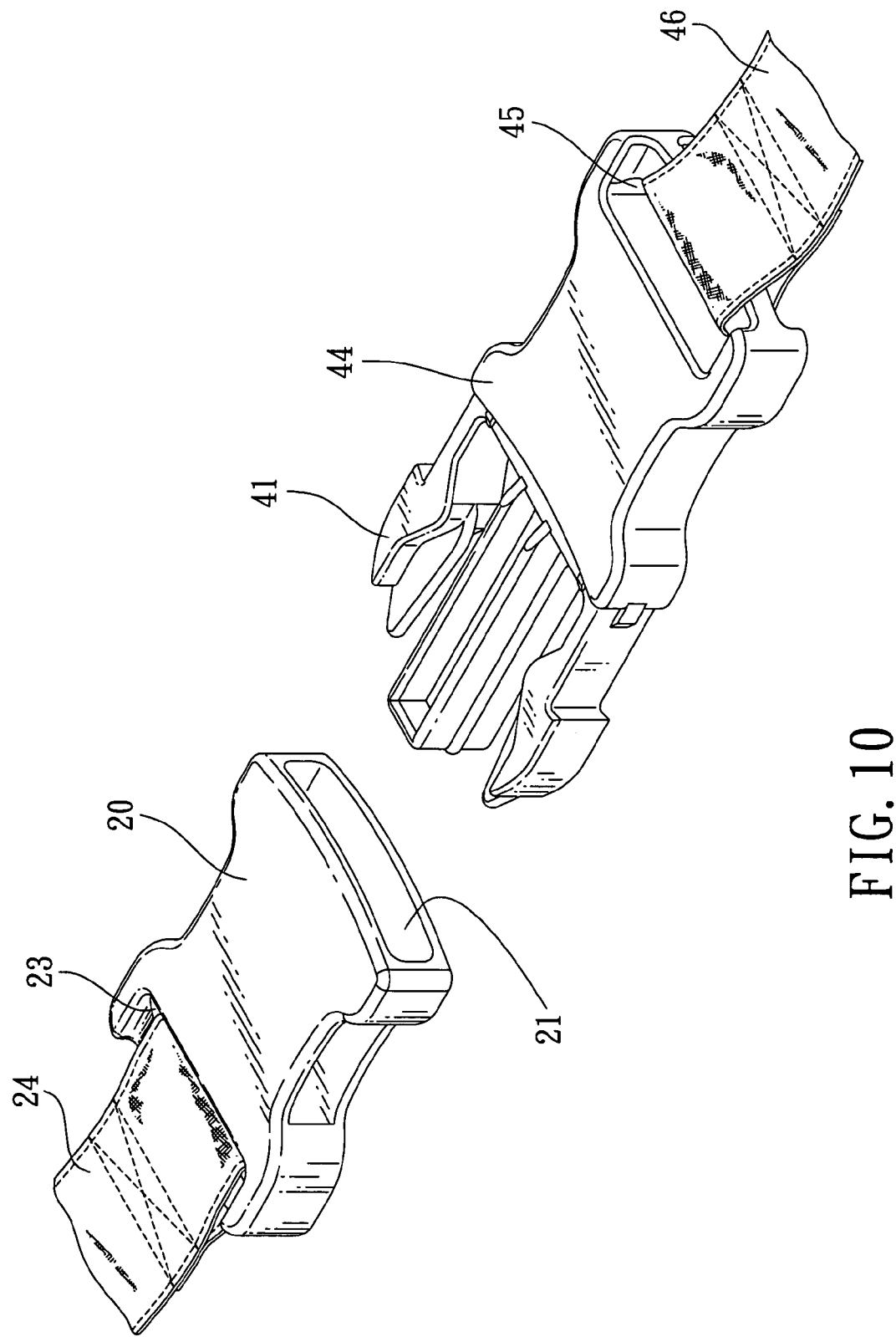
FIG. 10 shows a perspective view depicting another configuration of a female fastening member functioning in coordination with a male fastening member according to the present invention.
Figure 11:
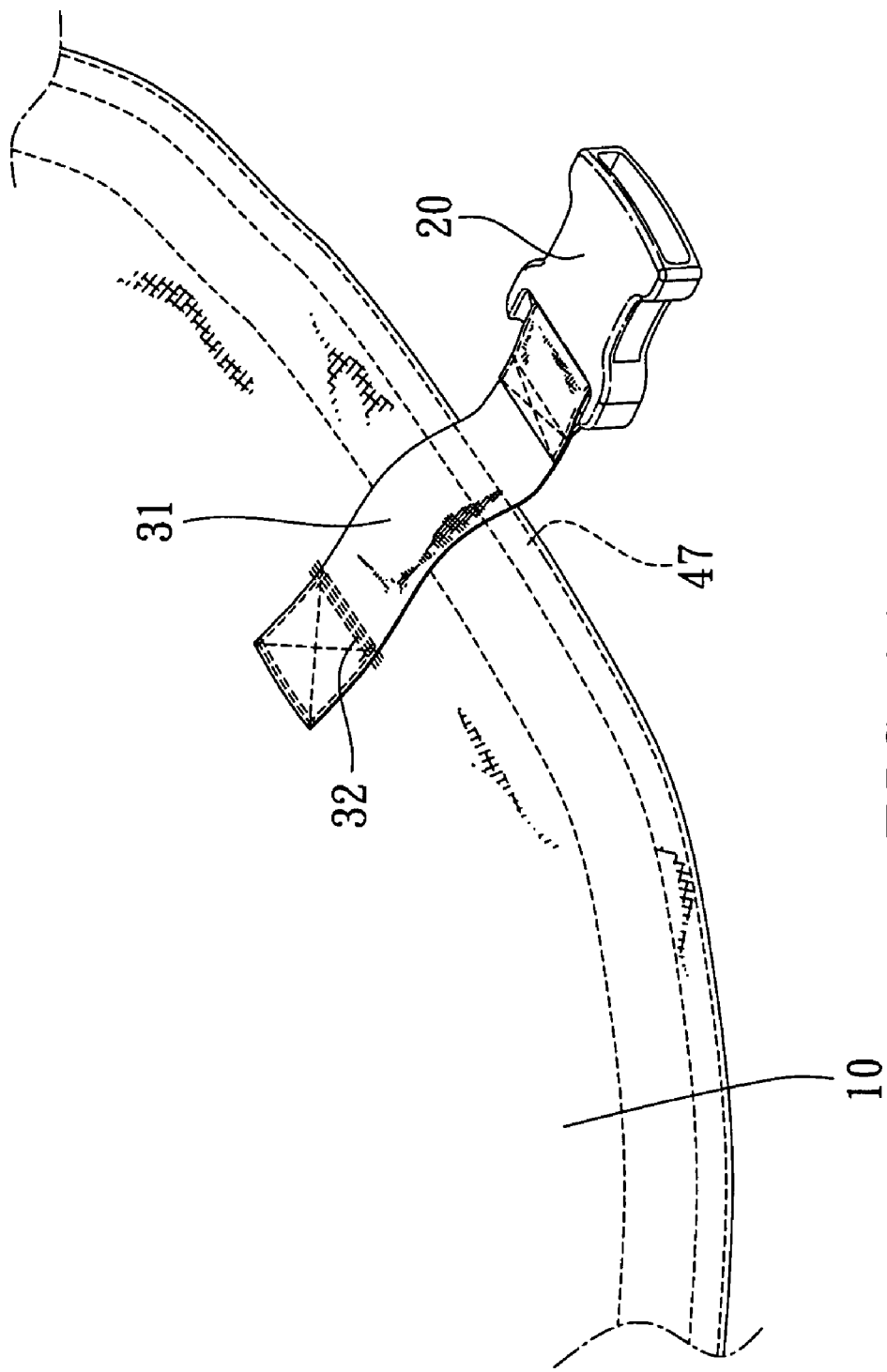
FIG. 11 shows a perspective view of a woven tape fastening member stitched to a covering body of prior art.

Referring to FIG. 10, which shows another configuration of the female fastening member 20 of the present invention, and the insertion slot 21 is similarly defined in a front end thereof. However, a fastening slot 23 is defined at a rear end of the female fastening member 20, which enables a woven tape 24 to thread through the fastening slot 23 and be fixedly stitched to the tether 30, thereby enabling the female fastening members 20 to be respectively joined to the recesses 15 in the circumferential edge of the covering 10. Each of the recesses 15 is cut so as to form a rectangular shape, and the insertion member 41 is similarly located at a front portion of a male fastening member 44 of a joining member. A fastening slot 45 is defined at a rear portion of the male fastening member 44, and a woven tape 46 is threaded through the fastening slot 45 and fixedly stitched, thereby enabling fixedly securing to a securing end by means of the woven tape 46.

Figure 6:
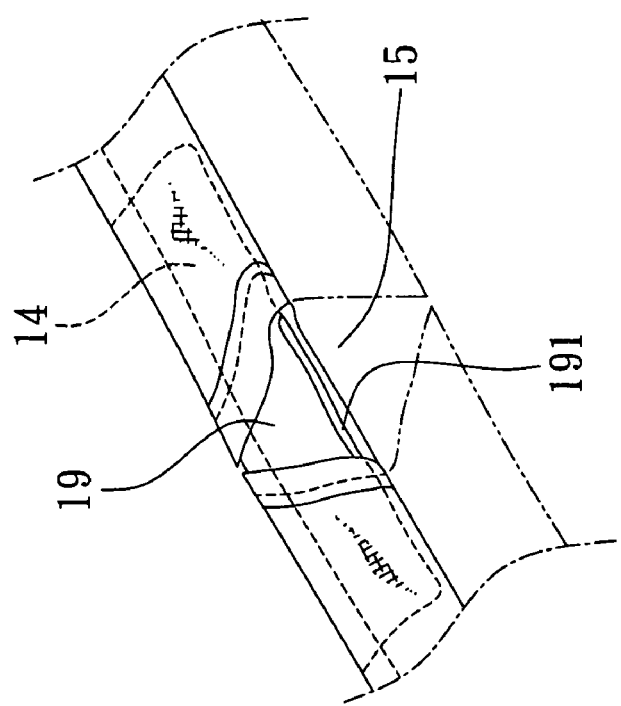
FIG. 6 shows an exterior view depicting the strengthening piece disposed in the recess according to the present invention.
Figure 5:
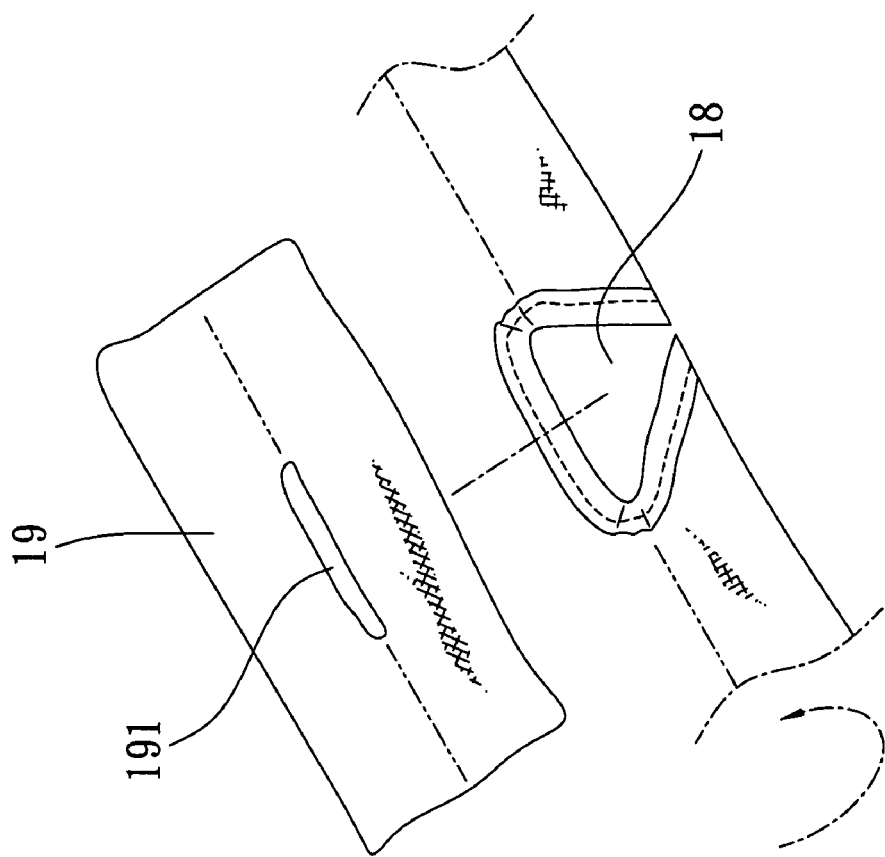
FIG. 5 shows, an exploded view depicting disposition of a strengthening piece in a recess according to the present invention.

Referring to FIGS. 5 and 6, which show the recess 15 as defined in the covering 10 of the present invention, wherein the recess 15 is formed by cutting into the edge of the covering 10 to form an inverted V-shaped incision 18, and a strengthening piece 19 is positionally disposed within the incision 18. A slit 191 is defined in a strengthening piece 19 corresponding to the incision 18, and fabric on two sides of the incision 18 together with the strengthening piece 19 are folded back and stitched to form the hem 14, thereby enabling the tether 30 to extend from the slit 191 of the strengthening piece 19 and be threaded through and wound round the through hole 22 of the female fastening member 20 (as depicted in FIG. 4). Hence, strength of the circumferential edge of the recess of the covering 10 is increased, thereby preventing the circumferential edge of the recess 15 from tearing because of pulling by the rope 43 when using the covering 10.

Figure 3:
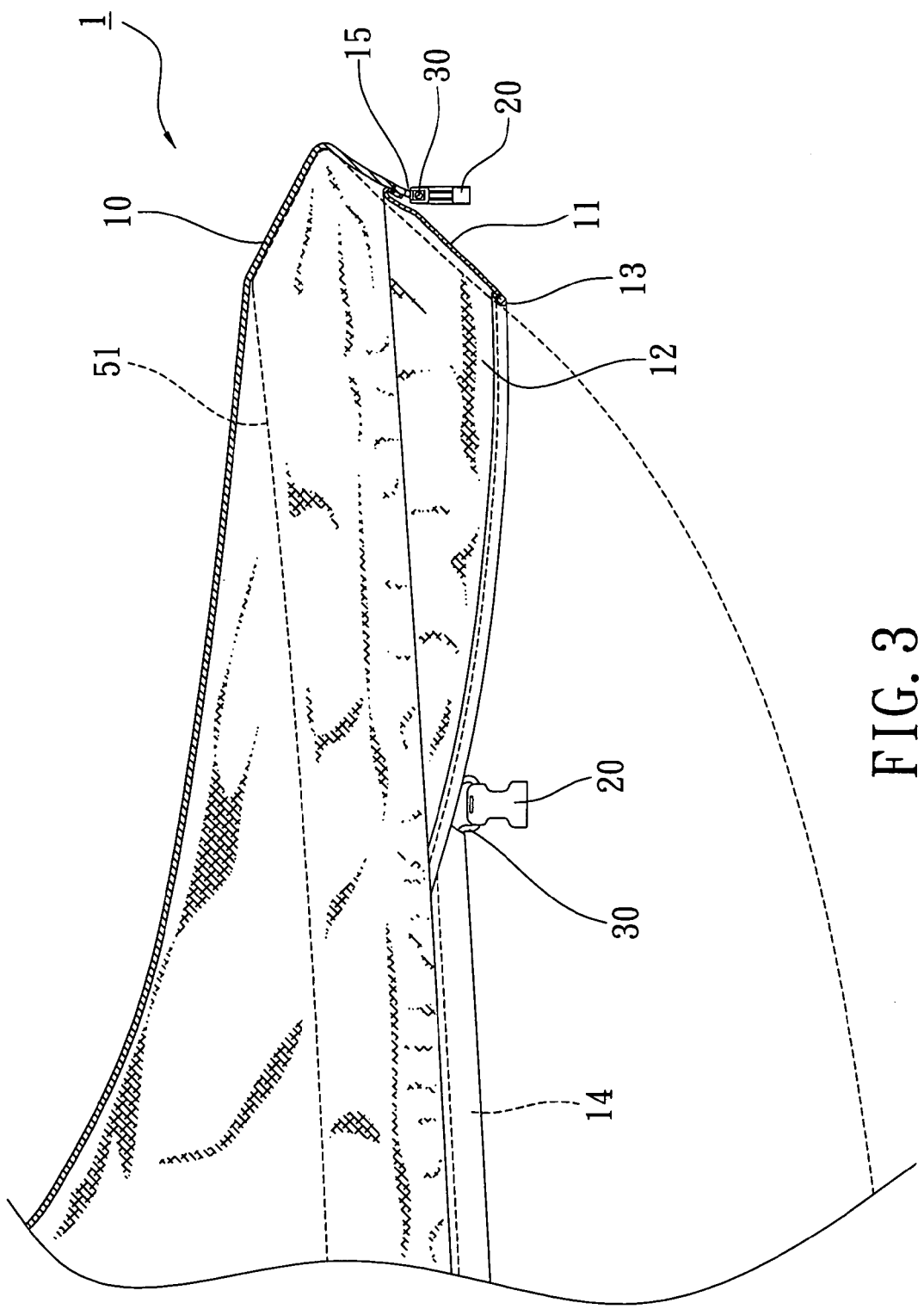
FIG. 3 shows a partial profile schematic view of a front end of the first embodiment according to the present invention.
Figure 8:
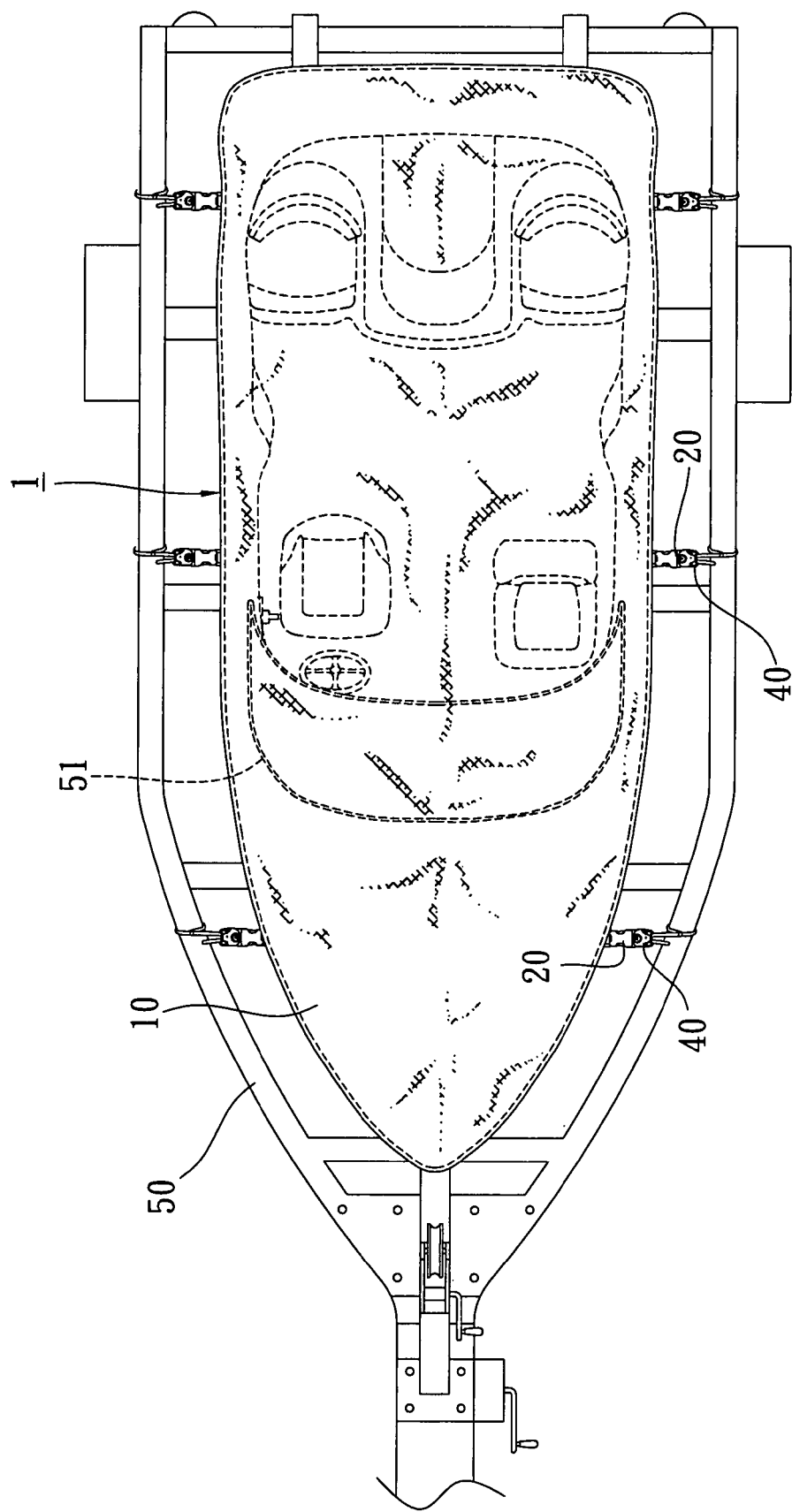
FIG. 8 shows a top view of the first embodiment of the present invention in use.

Referring to FIGS. 3, 7 and 8, which show an embodiment of the present invention in use status, wherein handling procedure involves first covering the bow of a yacht 51 using the pocket 12 of the front portion of the covering body 1 (see FIG. 3), and design of the pocket 12 prevents a rear section of the covering body 1 from coming away when covering and stretching the covering body 1, thereby achieving convenient and quick handling effectiveness. Next, the covering body 1 is stretched towards the rear to enable the covering 10 to completely cover the hull of the yacht 51, and the two end portions, which pass through and wind round the retaining ring fastening members 17, of the tether 30 located in the hem 14 at the end edge of the covering 10 at a rear end of the covering body 1 are pulled, thereby enabling the covering body 1 to tightly bind the covering 10 round the hull of the yacht 51. Thereafter, the female fastening members 20 located on the circumferential edge of the covering body 1 are mutually securely fastened with the antislip fastening members 40 of the load carrier (trailer) 50 (see FIG. 7A), and each of the pulling ends b of the ropes 43 is pulled to tighten the ropes 43. Because tightening force of each of the disposed female fastening member 20 is directly exerted on the tether 30, the covering body 1 is able to more tightly cover the yacht 51, thereby preventing a strong wind from blowing off the covering body 1, and simultaneously achieving effectiveness of securing the covering body 1 to the hull of the yacht 51, thus preventing the occurrence of slipping of the covering body 1.

Figure 9:
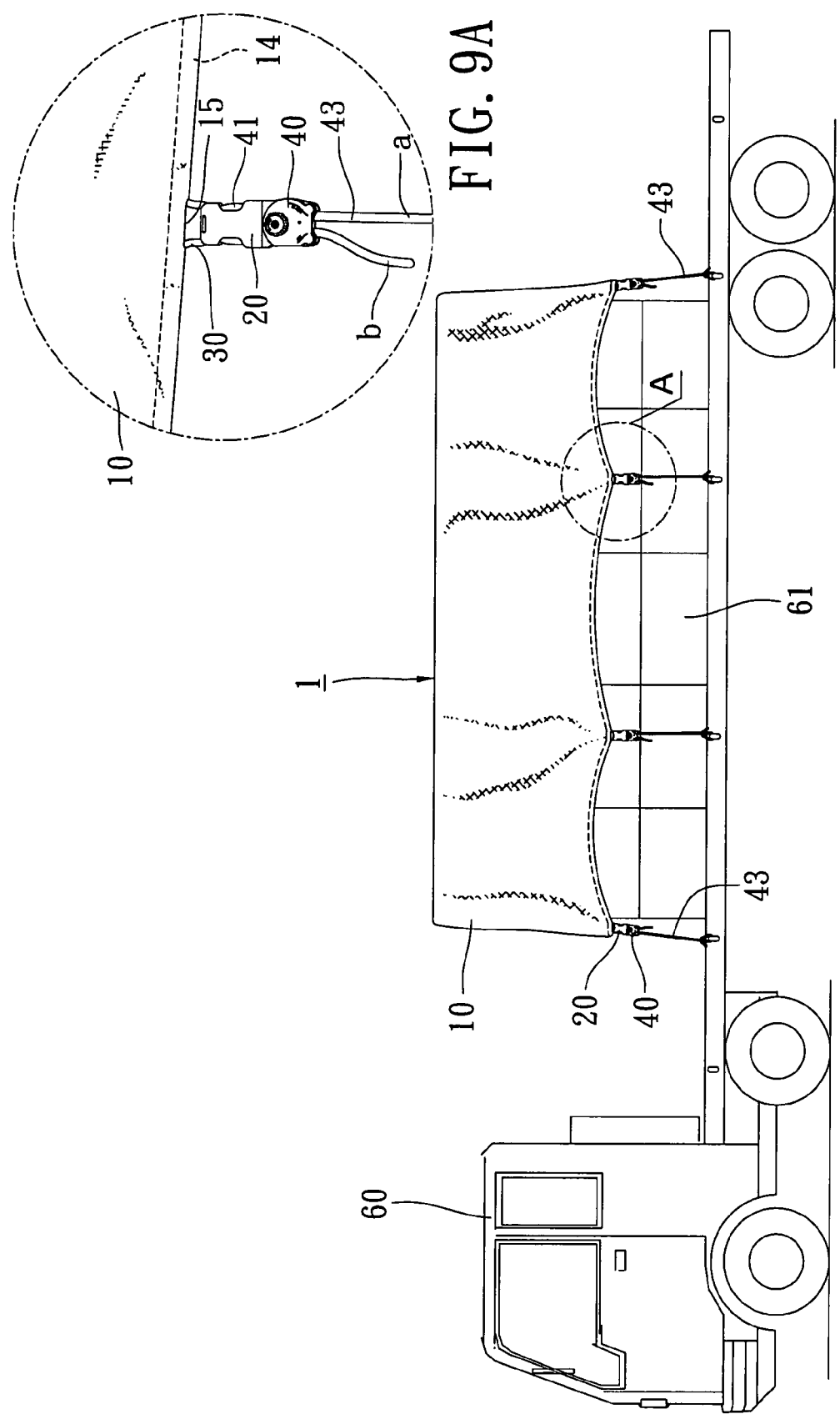
FIG. 9 shows a side view of a second embodiment of the present invention in use.

Referring to FIG. 9, which shows a second embodiment of the covering 10 of the present invention, wherein the covering 10 can also be designed with different forms, and is applicable for use in covering freight 61 on a freight truck 60, thereby preventing the freight 61 at a rear portion of the freight truck 60 from being exposed to sunlight and rain, and simultaneously achieving effectiveness of tightly binding the freight 61. The covering 10 of the covering body 1 of the second embodiment, as depicted in FIG. 9, is a flat blanket body, and the circumferential edge of the covering 10 is similarly folded back and stitched to form the hem 14 that enables the tether 30 to pass therethrough. A strengthening piece 16 is stitched to the hem 14 at the rear end of the covering 10, and the set of two retaining ring fastening members 17 (see FIG. 2A) is located on the two sides of the strengthening piece 16. Hence, after covering the freight 61 with the covering 10, the antislip fastening members 40 can be quickly inserted into and joined to the female fastening members 20 located on the periphery of the covering 10 (see FIG. 9A), whereafter ends of the tether 30 threaded round the retaining rings 17 at the rear end are pulled tight, and then pulling ends b of the ropes 43 of the antislip fastening members 40 are pulled tight one by one, thereby tightening the ropes 43.

Furthermore, the female fastening members 20 used to join to the antislip fastening members 40 and indirectly achieve mutual connecting effectiveness of the ropes 43 to the tether 30 located within the circumferential hollow hem 14 of the aforementioned covering 10 affords the use of different methods to mutually connect the ropes 43 to the tether 30, including a binding method to enable joining the ropes 43 to the tether 30 exposed outside the recesses 15, and a fixedly winding method to enable joining the ropes 43 to the tether 30 exposed outside the recesses 15. Accordingly, after joining the ropes 43 to the tether 30, force can be similarly applied to pull on the ropes 43 to affect a tugging action on the tether 30, thereby achieving tightening effectiveness.

In conclusion, the present invention assuredly achieves effectiveness of anticipated objectives, and provides a covering body configuration that enables quick covering and securing effectiveness. Moreover, practicability of the present invention is assured, accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is :

1. A covering and securing structure for a covering body comprising: a covering;
    a tether; and
    a plurality of ropes,
        wherein a hem is located at a circumferential edge of the covering, a plurality of recesses are formed in the hem, and the tether is threaded through the hem; a set of retaining rings is located on each of two sides of the hem at a rear end of the covering, thereby enabling the tether to pass through the hem and fasten onto the retaining rings of the two sides, the plurality of ropes are mutually joined to the exposed tether at the recess areas of the hem, thereby enabling achieving a firm binding effect after covering a boat.

2. The covering and securing structure for a covering body according to claim 1, wherein strengthening pieces are stitched to the hem at the rear end of the covering, and two adjacent sides of each of the strengthening pieces enable the tether to pass through the hem.

3. A covering and securing structure for a covering body comprising:
    a covering;
    a tether;
    a plurality of female fastening members;
    a plurality of male fastening members; and
    a plurality of ropes;
        wherein a hem is located at a circumferential edge of the covering of the covering, a plurality of recesses are formed in the hem, and the tether is threaded through the hem, the female fastening members are respectively disposed within the recesses, a through hole is defined at an end of each of the female fastening members, which enables the tether within the hem to thread therethrough, thereby enabling each of the female fastening members to be joined to the tether;
    wherein a plurality of male fastening joining members are used to respectively join to the female fastening members, the rope attached to each of the male fastening joining members is fixedly bound to a fixed location, thereby achieving a firm binding effect after covering with the covering.

4. The covering and securing structure for a covering body according to claim 2, wherein each male fastening joining member is combined with an antislip fastening member to form an integral body, thereby enabling each of the ropes to be threaded into an entrance-exit at bottom portion of the antislip fastening member and emerge from the entrance-exit after being wound round a unidirectional antislip mechanism located within the antislip fastening member.

5. The covering and securing structure for a covering body according to claim 2, wherein strengthening pieces are stitched to the hem at the rear end of the covering, and two adjacent sides of each of the strengthening pieces enable the tether to pass through the hem.

* * * * *